(12) United States Patent
Reynolds

(10) Patent No.: US 11,395,987 B2
(45) Date of Patent: Jul. 26, 2022

(54) SCRUBBER SYSTEM IMPROVEMENT FOR SULFUR CONTAINING GAS STREAMS

(71) Applicant: Veolia North America Regeneration Services, LLC, Houston, TX (US)

(72) Inventor: Edward J. Reynolds, Middletown, DE (US)

(73) Assignee: Veolia North America Regeneration Services, LLC, Houston, TX (US)

( * ) Notice: Subject to any disclaimer, the term of this patent is extended or adjusted under 35 U.S.C. 154(b) by 442 days.

(21) Appl. No.: 16/656,064

(22) Filed: Oct. 17, 2019

(65) Prior Publication Data
US 2021/0113954 A1 Apr. 22, 2021

(51) Int. Cl.
*B01D 53/14* (2006.01)
*B01D 71/02* (2006.01)
*C01B 17/74* (2006.01)

(52) U.S. Cl.
CPC ..... *B01D 53/1418* (2013.01); *B01D 53/1412* (2013.01); *B01D 53/1481* (2013.01); *B01D 71/02* (2013.01); *B01D 2252/10* (2013.01); *C01B 17/74* (2013.01)

(58) Field of Classification Search
CPC .. B01D 39/2068; B01D 53/50; B01D 53/504; B01D 53/78; B01D 61/00; B01D 65/00; B01D 2251/40; B01D 2252/103; B01D 2257/30; B01D 2257/302; B01D 2258/0283; B01D 71/02; B01D 53/1481; C02F 2103/18
See application file for complete search history.

(56) References Cited

U.S. PATENT DOCUMENTS

| 3,803,805 | A | 4/1974 | Low |
| 11,198,092 | B2 * | 12/2021 | Kumagai ............. B01D 53/504 |
| 2010/0186590 | A1 * | 7/2010 | Vorberg ................. C10L 3/102 |
| | | | 95/149 |
| 2015/0298056 | A1 * | 10/2015 | Kawamura .......... B01D 53/507 |
| | | | 423/528 |
| 2018/0200667 | A1 * | 7/2018 | Kagawa ................ B01D 53/50 |

FOREIGN PATENT DOCUMENTS

| CN | 106 669 361 A | * | 5/2017 | ............. B01D 47/00 |
| KR | 2005 007 489 A | * | 1/2005 | ......... B01D 53/1493 |
| MX | 363 426 B | * | 3/2019 | ......... B01D 53/507 |
| WO | WO 2008/100317 | | 8/2008 | |
| WO | WO 2014 083 982 A1 | * | 6/2014 | ........... B01D 53/507 |

* cited by examiner

*Primary Examiner* — Timothy C Vanoy
(74) *Attorney, Agent, or Firm* — Dunlap Codding, P.C.

(57) ABSTRACT

An improvement in a wet scrubbing process for treating gaseous industrial process streams which contain one or more of $SO_2$, $SO_3$, $H_2SO_4$ which comprises contacting the stream of gas with a countercurrent flow of liquid derived from a circulating liquid stream which includes (i) a purge stream configured to remove a portion of the circulating liquid having a concentration of $H_2SO_4$ from the process, and (ii) a liquid make-up stream configured to replace the portion of the circulating liquid that is removed from the circulating liquid stream, the improvement comprising controlling the flow of liquid make-up whereby the concentration of $H_2SO_4$ in the purge stream is increased to a useful value; and filtering the purge stream to remove unwanted contaminants to yield a clarified purge stream.

12 Claims, 3 Drawing Sheets

SCRUBBER SYSTEM IMPROVEMENT FOR SULFUR CONTAINING GAS STREAMS

BACKGROUND

The described and claimed inventive concept(s) relate to an improvement in wet scrubbing systems for treating sulfur-containing gaseous industrial process streams, and, more particularly, to wet gas scrubbing systems and processes of the type which include a quenching step in which the gas stream is contacted with a countercurrent flow of liquid.

U.S. Pat. No. 3,803,805 describes a gas cleaning method for effecting contact of a gas with a liquid by contacting the gas while flowing through a conduit by at least one jet of liquid flowing counter-currently to the gas. This type of reverse-jet process can be useful in sulfuric acid applications to remove solid particulates, $SO_2$, $SO_3$, and $H_2SO_4$ from a gas stream by contacting the gas stream with a circulating flow of a scrubbing liquid, usually water. As the solids and sulfur species are absorbed into the circulating liquid, it becomes dirty and acidic. The circulating solution must, therefore, be purged from the system and refreshed with make-up water. The purge can be either periodic or continuous. The volume of make-up water must be sufficient to dilute the scrubbed solids and prevent them from clogging components in the scrubber system. In addition, the purge stream described in U.S. Pat. No. 3,803,805 is typically neutralized with a base, e.g., NaOH, before further treatment and/or discharge to the environment.

International Publication WO 2008/100317 A1 describes a wet scrubbing process for treating sulfur-containing gaseous industrial process streams for selective removal of sulfur-containing species, such as, for example, $SO_2$, $SO_3$, $H_2SO_4$, and mixtures thereof. An aqueous scrubbing liquid is used comprising a basic reagent, e.g., NaOH, generally having a pH of at least about 8.5, and preferably as high as 9.5 which is believed to improve process performance in desulfurization applications. In order to maintain the pH of the scrubbing liquid, additional NaOH must be added to the spent scrubbing solution.

In sulfuric acid production facilities, such as, for example, in a spent acid regeneration facility in which a wet scrubbing process is deployed, the cost of a base like NaOH can represent up to about 10% of the total production cost. There is an economic incentive, therefore, to develop process improvements which reduce or even eliminate the need for neutralization chemicals in scrubbing sulfur-containing gaseous industrial process streams.

SUMMARY

The described and claimed inventive concept(s) relates generally to an improvement in a wet scrubbing process for treating gaseous industrial process streams, and particularly those gaseous industrial process streams which contain one or more of $SO_2$, $SO_3$, $H_2SO_4$, and mixtures thereof. Such wet scrubbing processes are typically arranged with various means to condition the gaseous process stream by at least quenching the gas stream with a countercurrent flow of a liquid derived from a circulating liquid stream, with the result that $SO_3$ and $H_2SO_4$ pass from the gaseous process stream into the circulating liquid stream along with various solid particulates. The circulating liquid stream typically includes (i) one or more purge streams configured to remove a portion of the circulating liquid having a concentration of $H_2SO_4$ from the process, and (ii) at least one liquid make-up stream configured to replace the portion of the circulating liquid that has been removed from the circulating liquid stream. The improvement according to one embodiment comprises:

1.) controlling the flow of liquid make-up whereby the concentration of $H_2SO_4$ in the purge stream(s) is increased to a useful value, for example, in the range of from 20 wt % up to 60 wt %; and
2.) filtering the purge stream(s) to remove unwanted solid particulates to yield a clarified purge stream. The solid particulates comprise unwanted contaminants, which can include, for example, ash and organic residues.

Controlling the flow of liquid make-up can be accomplished with a control valve that is programmed to maintain the concentration of sulfuric acid in the circulating liquid stream. The control valve can be coupled to a strength analyzer that has means for measuring the sulfuric acid strength in the liquid stream.

Increasing the concentration of $H_2SO_4$ in the purge stream to a useful value whereby it can be returned to the production process avoids the need to otherwise neutralize the purge stream with a base preliminary to discharging it as a waste stream.

According to another embodiment, the improvement includes an additional step of mixing the clarified purge stream, now having a concentration of sulfuric acid that can be as high as 60 wt %, with a sulfuric acid product stream. A typical sulfuric acid product stream can have a concentration in the range of from 90 wt % up to 100 wt %.

The described and claimed inventive concept(s) relates, more particularly, to a spent sulfuric acid regeneration process of the type having a gas cleaning section for treating a stream of gas, which may contain one or more of $SO_2$, $SO_3$, $H_2SO_4$, and mixtures thereof. $H_2SO_4$ is removed from the stream of gas by contacting the stream of gas with a countercurrent flow of a scrubbing liquid. The countercurrent flow of scrubbing liquid is derived from a circulating liquid stream with the result that $SO_3$ and $H_2SO_4$ pass from the gas stream into the circulating liquid stream. In operation, the circulating liquid stream includes (i) one or more purge streams configured to remove a portion of the circulating liquid having a concentration of $H_2SO_4$ from the process, and (ii) at least one liquid make-up stream configured to replace the portion of the circulating liquid that has been removed from the circulating liquid stream. According to one embodiment, the improvement comprises:

1.) controlling the flow of liquid make-up whereby the concentration of $H_2SO_4$ in the purge stream is increased to a useful value, preferably in the range of from 20 wt % up to 60 wt %, and
2.) filtering the purge stream to remove unwanted contaminants to yield a clarified purge stream. As noted above, unwanted contaminants can include particulate matter, such as ash and organic residues.

As described above, controlling the flow of liquid make-up can be accomplished with a control valve that is programmed to maintain the concentration of sulfuric acid in the circulating liquid stream. The control valve can be coupled to a strength analyzer that has means for measuring the sulfuric acid strength in the liquid stream.

According to yet another embodiment, the improvement includes the additional step of mixing the clarified purge stream with a sulfuric acid product stream.

According to yet another embodiment, filtering is accomplished by passing the purge stream through a silicon carbide membrane.

According to yet another embodiment, quenching the gaseous process streams with a countercurrent flow of a scrubbing liquid is accomplished by passing the gaseous process streams through a reverse jet scrubber.

The step of filtering the purge stream to remove unwanted contaminants can be accomplished by any filter membrane or other filtering means deemed suitable for the particular process for which the described and claimed inventive concept(s) is being implemented. According to one embodiment, however, in connection with spent sulfuric acid recovery, filtering is preferably accomplished by passing the purge stream through a silicon carbide membrane which has been observed to produce satisfactory results in removing ash and other fine particulate matter from the liquid purge stream.

In a preferred embodiment according to the described and claimed inventive concept(s) the circulating liquid is aqueous, e.g., a weak aqueous sulfuric acid stream wherein the concentration of sulfuric acid is not more than 70 wt %.

DETAILED DESCRIPTION OF THE INVENTION

Figure 1:
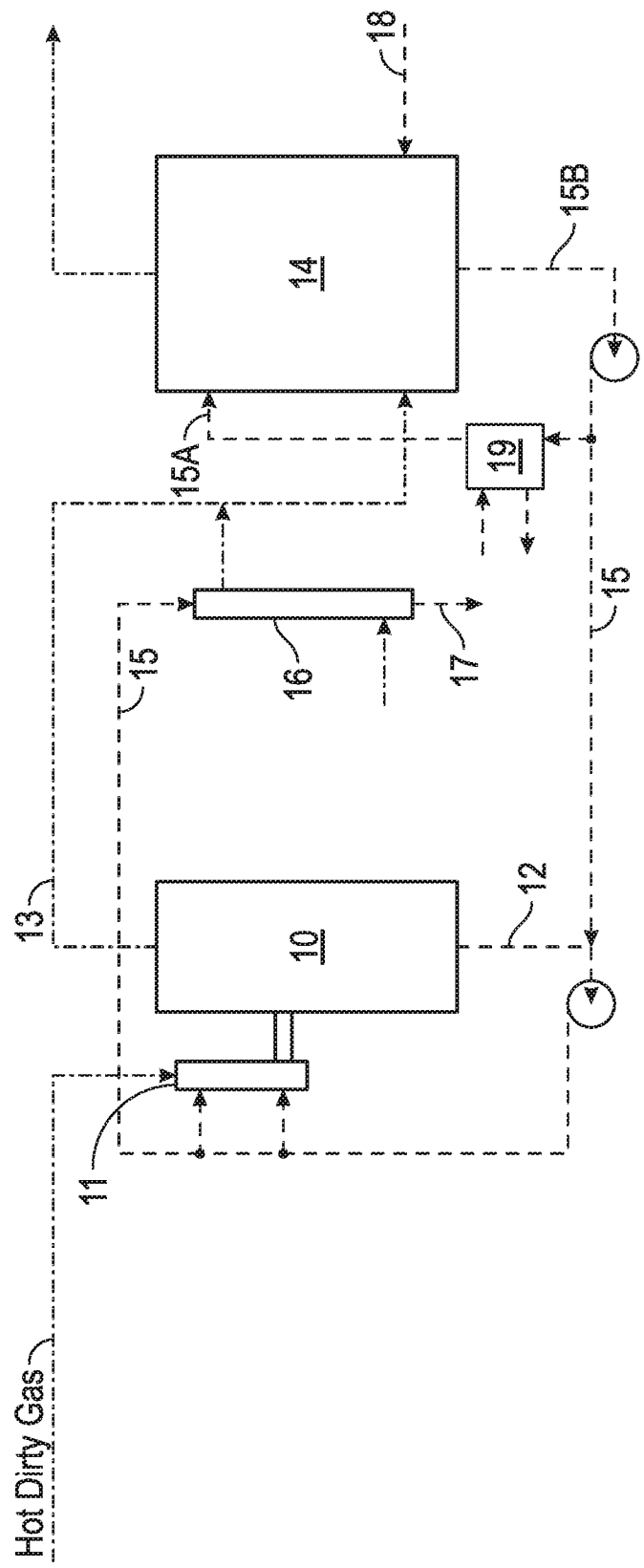
FIG. 1 is a simplified process diagram of a portion of a spent sulfuric acid regeneration process arranged to illustrate gas cooling and cleaning.

Before explaining at least one embodiment of the presently disclosed and claimed inventive concept(s) in detail, it is to be understood that the presently disclosed and claimed inventive concept(s) is not limited in its application to the details of construction and the arrangement of the components or steps or methodologies set forth in the following description or illustrated in the drawings. The presently disclosed and claimed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed and claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which this presently disclosed and claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed and claimed herein can be made and executed without undue experimentation in light of the present disclosure. While the articles and methods of the presently disclosed and claimed inventive concept(s) have been described in terms of particular embodiments, it will be apparent to those of skill in the art that variations may be applied to the articles and/or methods and in the steps or in the sequence of steps of the method described herein without departing from the concept, spirit and scope of the presently disclosed and claimed inventive concept(s). All such similar substitutes and modifications apparent to those skilled in the art are deemed to be within the spirit, scope and concept of the presently disclosed and claimed inventive concept(s) as defined by the appended claims.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z. The use of ordinal number terminology (i.e., "first," "second," "third," "fourth," etc.) is solely for the purpose of differentiating between two or more items and is not meant to imply any sequence or order or importance to one item over another or any order of addition, for example.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

The inventive concept(s) will now be explained according to one embodiment in relation to a spent sulfuric acid regeneration process of the type which employs a gas cleaning section, i.e., gas cooling and purification, for treating sulfur dioxide process gas. Those skilled in the art of process design, development and operation will understand that the inventive concept(s) described herein can be successfully applied to a variety of other wet scrubbing processes for treating gaseous industrial process streams which contain one or more of $SO_2$, $SO_3$, $H_2SO_4$, and mixtures thereof.

Many industrial facilities produce a spent sulfuric acid by-product that is capable of being regenerated into a full strength high-quality sulfuric acid. A typical spent sulfuric acid regeneration process can have four steps:

(1) Formation of a sulfur dioxide process gas stream by decomposition of spent acid and the combustion of molten sulfur, hydrogen sulfide or other sulfur containing species and combinations thereof in a regeneration furnace;

(2) Cooling and purification, i.e., cleaning, the sulfur dioxide process gas;

(3) Conversion of sulfur dioxide ($SO_2$) into sulfur trioxide ($SO_3$); and (4) Absorption of sulfur trioxide ($SO_3$) into sulfuric acid ($H_2SO_4$).

With reference to step (2), gas cooling, i.e., energy recovery, can be accomplished in a variety of ways, including, for example, by making high pressure steam in a waste heat boiler, or by heating process gas in another part of the system, or by a combination of those aspects. Gas leaving the cooling section is dirty, e.g., can have a high ash content, and has a relatively high temperature in the range of from 300° C.-600° C. as well as a water content of up to 30 mole %. This $SO_2$ containing gas, therefore, is passed through gas purification equipment which is configured to (i) remove sensible heat (cooling); (ii) remove latent heat and water (condensing); (iii) remove unwanted particulates (scrubbing); and (iv) remove coarse and fine mist (demisting). Ash particulate, including organic residues, and trace levels of $SO_3$ are removed while decomposition gases are quenched by adiabatic saturation of the gas in a primary reverse jet scrubber.

Referring now to FIG. 1, there is shown a simplified process diagram of a portion of a current spent sulfuric acid regeneration process arranged to illustrate gas cooling and cleaning, i.e., purification. Hot dirty gas which contains $SO_3$ enters primary reverse jet scrubber inlet barrel 11, as shown, where it is quenched. While FIG. 1 depicts a simplified process design including one reverse jet scrubber configuration, those skilled in the art of process design, development and operation will understand that a reverse jet scrubber suitable for use according to the described and claimed inventive concept(s) can have a variety of different configurations and still accomplish cooling and particulate removal.

The quenched gas passes into primary reverse jet scrubber disengagement vessel 10. Ash particulate and trace levels of $SO_3$ are removed via outlet line 12. Warm $SO_2$ gas passes via line 13 to packed cooling tower 14. Further gas cooling and water condensing are achieved in packed cooling tower 14 where cold weak acid entering via line 15A flows downwardly over packing and contacts the warm $SO_2$ gas arriving via line 13 from primary reverse jet scrubber 10. Weak acid ($H_2SO_4$) that has been condensed in cooling tower 14 exits the cooling tower via line 15B and is returned to primary reverse jet scrubber inlet barrel 11 via line 15. A portion of the recirculating weak acid passes into reverse jet scrubber inlet barrel 11, while another portion of the recirculating weak acid passes via line 15 to $SO_2$ scrubber 16 as shown. Aqueous waste discharging from $SO_2$ scrubber 16 via line 17 is neutralized with a suitable base, e.g., NaOH, before being purged, i.e., discharged, from the process. Inlet stream 18 operates to replace, i.e., make-up, water that has been lost due to evaporation and aqueous waste that has been purged from the system via line 17. Heat exchanger 19 is deployed as shown to assist in controlling the temperature of liquid circulating in cooling tower 14. Typically, liquid discharging from cooling tower 14 via line 15B will have an $H_2SO_4$ acid concentration in the range of about 0.5 wt % while weak acid circulating via line 15 and aqueous waste discharging via line 17 can have an $H_2SO_4$ acid concentration in the range of about 7.5 wt %.

Figure 2:
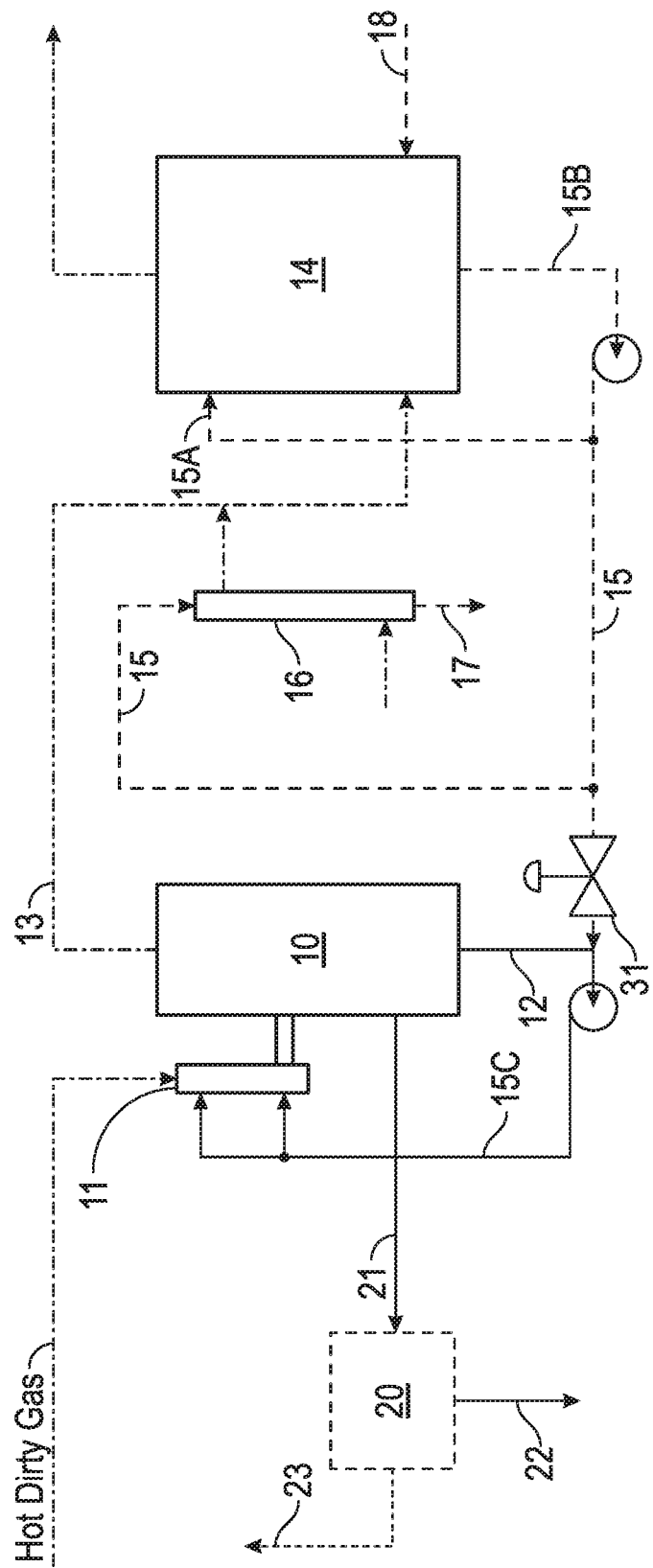
FIG. 2 is a simplified process diagram of a portion of a spent sulfuric acid regeneration process arranged to illustrate the described and claimed inventive concept(s) in relation to gas cooling and cleaning.

The described and claimed inventive concept(s) can best be seen according to one embodiment with reference to FIG. 2. In addition to the process streams and equipment shown in FIG. 1, FIG. 2 shows the addition of filter 20 which is configured to receive an inlet stream 21 from reverse jet scrubber disengagement vessel 10. In operation, aqueous liquid circulating within the gas cooling and cleaning section via lines 15, 15A and 15B as well as liquid make-up via line 18 are balanced, i.e., controlled so that the weak $H_2SO_4$ acid concentration in line 15C increases to a value in the range of about 50 wt %, while the acid concentration in line 17 being discharged from $SO_2$ stripper 16 decreases to a value in the range of about 0.5 wt %. Balancing, or controlling, the flow of liquid make-up can be conveniently accomplished with a control valve 31 positioned as shown that is programmed to maintain the concentration of sulfuric acid in the circulating liquid stream. Control valve 31 can be coupled to a strength analyzer (not shown) that has means for measuring the sulfuric acid strength in the liquid stream.

Stream 21, in addition to containing undesirable contaminants, such as ash, carbon particulates, Fe and oxides, also has an $H_2SO_4$ acid concentration in the range of about 50 wt %. Passing $H_2SO_4$ via line 21 through filter 20 operates to produce a clarified purge stream 22 having a useful concentration of $H_2SO_4$, for example, in the range of about 50 wt %, that can be returned directly to the $H_2SO_4$ production process, for example, by mixing the purge stream with an $H_2SO_4$ product stream (not shown). As a result of the described and claimed inventive concept(s), the volume of aqueous waste needing neutralization prior to being discharged from the process via line 17 as well as the amount of base required for aqueous waste neutralization is substantially reduced. Line 23 serves to remove ash, organic residues and other contaminants from the system through either continuous or intermittent flushing. According to one embodiment, filter 20 comprises a silicon carbide membrane, although any other membrane or filter system having the same or similar chemical and mechanical characteristics can also be used with satisfactory results.

Figure 3:
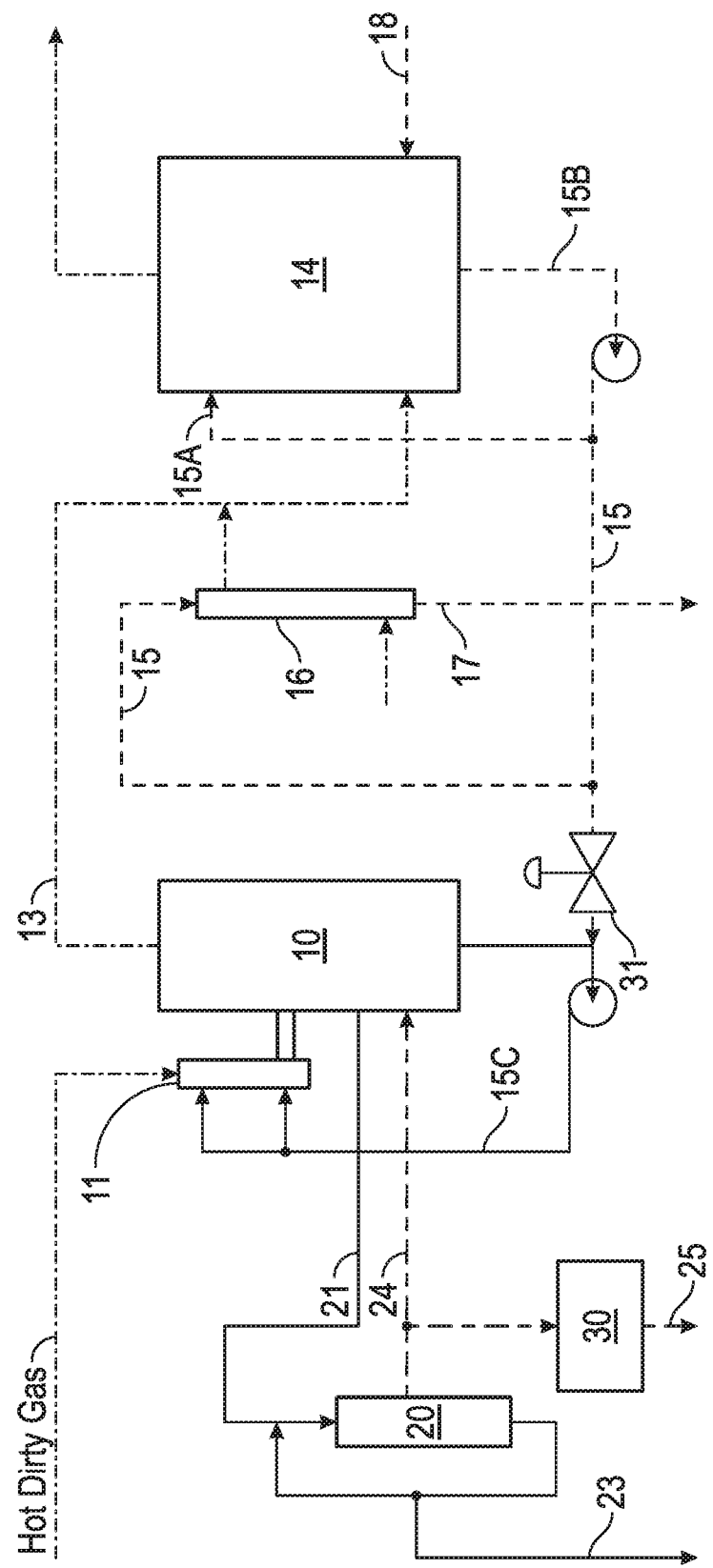
FIG. 3 is a simplified process diagram of a portion of a spent sulfuric acid regeneration process arranged to illustrate an alternative embodiment of the described and claimed inventive concept(s) in relation to gas cooling and cleaning.

Referring now to FIG. 3, there is shown an alternate embodiment of the instant inventive concept(s) in which permeate tank 30 has been incorporated into a circulation loop 24 with filter 20. Line 21 delivers an $H_2SO_4$ stream from reverse jet scrubber disengagement vessel 10 to filter 20. Circulation loop 24 returns a clean liquid $H_2SO_4$ stream to reverse jet scrubber disengagement vessel 10. Permeate tank 30 receives a side stream of clean $H_2SO_4$ which is discharged via line 25 to either return to the regeneration furnace or for mixing with an $H_2SO_4$ product stream (not shown).

As those skilled in the art will appreciate, numerous modifications and variations of the described and claimed inventive concept(s) are possible in light of these teachings, and all such modifications and variations are contemplated hereby. The present invention contemplates and claims those inventions that may result from the combination of features described herein and those of the cited prior art references which complement the features of the present invention.

What is claimed is:

1. In a wet scrubbing process for treating gaseous industrial process streams which may contain one or more of $SO_2$, $SO_3$, $H_2SO_4$ and mixtures thereof, wherein said wet scrubbing process is arranged to condition said gaseous process stream by at least quenching said gaseous process stream with a countercurrent flow of liquid derived from a circulating liquid stream with the result that $SO_3$ and $H_2SO_4$ pass from the gaseous process stream into the circulating liquid stream, and wherein said circulating liquid stream includes (i) one or more purge streams configured to remove a portion of the circulating liquid having a concentration of $H_2SO_4$ from the process, and (ii) at least one liquid make-up stream configured to replace the portion of the circulating liquid that has been removed from the circulating liquid stream, the improvement comprising:
   1) controlling the flow of liquid make-up whereby the concentration of $H_2SO_4$ in the purge stream is increased to a useful value; and
   2) filtering the purge stream to remove unwanted contaminants to yield a clarified purge stream.

2. The improvement of claim 1 which includes an additional step of mixing the clarified purge stream with a sulfuric acid product stream.

3. The improvement of claim 1 or claim 2 wherein filtering is accomplished by passing the purge stream through a silicon carbide membrane.

4. The improvement of claim 3 wherein quenching said gaseous process stream with a countercurrent flow of liquid is accomplished by passing said gaseous process stream through a reverse jet scrubber.

5. The improvement of claim 4 wherein the circulating liquid is a weak aqueous sulfuric acid stream.

6. The improvement of claim 5 wherein the concentration of the weak aqueous sulfuric acid stream is less than 70 wt %.

7. In a spent sulfuric acid recovery process of the type having a gas cleaning section for treating a stream of gas, which may contain one or more of $SO_2$, $SO_3$, $H_2SO_4$ and mixtures thereof, to remove $H_2SO_4$ by contacting the stream of gas with a countercurrent flow of liquid derived from a circulating liquid stream with the result that $SO_3$ and $H_2SO_4$ pass from the gas stream into the circulating liquid stream, and wherein said circulating liquid stream includes (i) one or more purge streams configured to remove a portion of the circulating liquid having a concentration of $H_2SO_4$ from the process, and (ii) at least one liquid make-up stream configured to replace the portion of the circulating liquid that has been removed from the circulating liquid stream, the improvement comprising:
   1) controlling the flow of liquid make-up whereby the concentration of $H_2SO_4$ in the purge stream is increased to a useful value; and
   2) filtering the purge stream to remove unwanted contaminants to yield a clarified purge stream.

8. The spent sulfuric acid recovery process of claim 7 wherein the flow of liquid make-up in step 1) is controlled with a control valve that is coupled to a strength analyzer and programmed to maintain the concentration of sulfuric acid in the circulating liquid stream.

9. The improvement of claim 7 which includes the additional step of mixing the clarified purge stream with a sulfuric acid product stream.

10. The improvement of claim 7 or claim 8 wherein filtering is accomplished by passing the purge stream through a silicon carbide membrane.

11. The improvement of claim 7, claim 8, or claim 9 wherein contacting said gas stream with a countercurrent flow of liquid is accomplished by passing said gas stream through a reverse jet scrubber.

12. The improvement of claim 11 wherein the circulating liquid is a weak aqueous sulfuric acid stream.

* * * * *